United States Patent
Varadarajan

(10) Patent No.: US 12,307,446 B2
(45) Date of Patent: May 20, 2025

(54) SECURE MULTI-FACTOR USER AUTHENTICATION ON DISCONNECTED MOBILE DEVICES

(71) Applicant: PayPal, Inc., San Jose, CA (US)

(72) Inventor: Srinivasan Varadarajan, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 586 days.

(21) Appl. No.: 17/538,198

(22) Filed: Nov. 30, 2021

(65) Prior Publication Data

US 2022/0092590 A1 Mar. 24, 2022

Related U.S. Application Data

(63) Continuation of application No. 14/887,997, filed on Oct. 20, 2015, now Pat. No. 11,257,075.

(51) Int. Cl.
*G06Q 20/38* (2012.01)
*G06F 21/32* (2013.01)
(Continued)

(52) U.S. Cl.
CPC ......... *G06Q 20/3829* (2013.01); *G06F 21/32* (2013.01); *G06F 21/64* (2013.01);
(Continued)

(58) Field of Classification Search
CPC ......... G06Q 20/3829; G06Q 20/40145; G06Q 2220/00; H04W 12/068; H04L 63/0861;
(Continued)

(56) References Cited

U.S. PATENT DOCUMENTS 6,317,834 B1 * 11/2001 Gennaro ............... G07C 9/37
 713/182
8,423,462 B1 * 4/2013 Amacker ............ G06Q 20/363
 705/41

(Continued)

OTHER PUBLICATIONS

Abdellaoui R., et al., "Secure Communication for Internet Payment in Heterogeneous Networks", 24th IEEE International Conference on Advanced Information Networking and Applications, 2010, 8 pages.

(Continued)

*Primary Examiner* — John W Hayes
*Assistant Examiner* — Edgar R. Martinez-Hernandez
(74) *Attorney, Agent, or Firm* — Haynes and Boone, LLP

(57) ABSTRACT

Embodiments described herein disclose a mobile device system for providing access to a subset of data within an application executed by the mobile device. During a first time period, when the mobile device is connected to a network, authentication information corresponding to a user account with a payment services provider is received. A biometric authentication signature and password are received in response to a request to enable access to a subset of data associated with the account. The subset of data is encrypted with a key generated from the biometric signature and password and stored. At a second time period, when the mobile device is disconnected from a network, the subset of data is decrypted using a key generated from an entered biometric signature and password.

20 Claims, 14 Drawing Sheets

(51) Int. Cl.
*G06F 21/64* (2013.01)
*G06Q 20/40* (2012.01)
*H04L 9/40* (2022.01)
*H04W 12/06* (2021.01)

(52) U.S. Cl.
CPC ..... *G06Q 20/40145* (2013.01); *H04L 63/083* (2013.01); *H04L 63/0861* (2013.01); *H04W 12/068* (2021.01); *G06Q 2220/00* (2013.01); *H04L 2463/082* (2013.01)

(58) Field of Classification Search
CPC . H04L 63/083; H04L 2463/082; G06F 21/32; G06F 21/64
See application file for complete search history.

(56) References Cited

U.S. PATENT DOCUMENTS

| | | | | |
|---|---|---|---|---|
| 8,769,275 | B2* | 7/2014 | von Mueller | G06Q 20/4012 713/168 |
| 9,141,953 | B2* | 9/2015 | Hazel | G06Q 20/12 |
| 9,210,133 | B2* | 12/2015 | Yau | H04L 63/0807 |
| 9,218,507 | B2* | 12/2015 | Bowers | G06F 21/6254 |
| 9,256,873 | B2* | 2/2016 | Patel | G06Q 20/3226 |
| 9,332,018 | B2* | 5/2016 | Liebl, III | H04L 67/04 |
| 9,852,423 | B2* | 12/2017 | Sagady | G06Q 20/3829 |
| 2002/0091562 | A1* | 7/2002 | Siegel | G06Q 30/06 705/26.7 |
| 2007/0239994 | A1* | 10/2007 | Kulkarni | H04L 9/0866 713/189 |
| 2008/0155269 | A1* | 6/2008 | Yoshikawa | H04L 9/3231 713/186 |
| 2010/0185855 | A1* | 7/2010 | Margolus | G06F 21/645 380/282 |
| 2011/0225642 | A1* | 9/2011 | Gopalakrishna | H04L 67/54 709/221 |
| 2013/0179352 | A1* | 7/2013 | Dwyre | G06Q 20/401 705/71 |
| 2013/0312120 | A1* | 11/2013 | Risan | G06F 21/6218 726/33 |
| 2013/0332185 | A1* | 12/2013 | George | G16H 40/67 705/2 |
| 2014/0013406 | A1* | 1/2014 | Tremlet | G09C 1/00 726/5 |
| 2014/0136417 | A1* | 5/2014 | Spodak | G06K 19/0723 705/65 |
| 2014/0365782 | A1* | 12/2014 | Beatson | G06V 30/1478 713/186 |
| 2015/0006907 | A1* | 1/2015 | Brouwer | H04L 9/0838 713/189 |
| 2015/0046339 | A1* | 2/2015 | Wong | G06Q 20/4016 705/44 |
| 2015/0095238 | A1* | 4/2015 | Khan | G06Q 20/382 705/71 |
| 2015/0278795 | A1* | 10/2015 | Jiang | G06Q 20/3823 705/44 |
| 2015/0339664 | A1* | 11/2015 | Wong | H04L 63/0823 705/71 |
| 2015/0347734 | A1* | 12/2015 | Beigi | H04L 9/3268 726/28 |
| 2016/0110718 | A1* | 4/2016 | Jajara | G06Q 20/4016 705/44 |
| 2016/0125388 | A1* | 5/2016 | Gao | G06Q 20/0855 705/73 |
| 2016/0218875 | A1 | 7/2016 | Le Saint et al. | |
| 2016/0219046 | A1* | 7/2016 | Ballard | H04L 63/0861 |
| 2016/0224977 | A1* | 8/2016 | Sabba | G06Q 20/385 |
| 2016/0371716 | A1* | 12/2016 | Aitenbichler | G06Q 20/387 |
| 2018/0255185 | A1* | 9/2018 | Nanjundan | H04M 15/60 |

OTHER PUBLICATIONS

Graf F., et al., "A Capability-Based Transparent Cryptographic File System", Proceedings of the 2005 International Conference on Cyberworlds, 2005, 8 pages.

Nayadkar P.P., "Automatic and Secured Backup and Restore Technique in Android", IEEE Sponsored 2nd International Conference on Innovations in Information Embedded and Communication Systems, 2015, 4 pages.

* cited by examiner

SECURE MULTI-FACTOR USER AUTHENTICATION ON DISCONNECTED MOBILE DEVICES

CROSS REFERENCE TO RELATED APPLICATIONS

This application is a Continuation of U.S. patent application Ser. No. 14/887,997, filed Oct. 20, 2015, which is incorporated by reference in its entirety.

BACKGROUND

Field

The present disclosure generally relates to mobile transactions and more particularly to a system and method that authenticates an offline device to transactional data.

Related Art

More and more consumers are conducting transactions, such as searching for and purchasing, items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment services provider such as, for example, PayPal, Inc. of San Jose, CA. Such payment services providers can make transactions easier and safer for the parties involved. Purchasing with the assistance of a payment services provider from the convenience of virtually anywhere using a mobile device is one main reason why on-line and mobile purchases are growing very quickly.

Additionally, many consumers may use applications provided by payment services providers to make purchases at traditional, brick-and-mortar establishments. Using these applications may permit the consumer to eliminate the need to carry credit cards, and can provide the user with the ability to manage multiple payment sources, loyalty programs, and other related information. These applications may also permit the user to review or monitor his or her transactional activity or other account activity. Merchants may also use these applications to accept payments using the payment services provider as a payment processor. Merchants may also use reporting tools to monitor transactions and for bookkeeping purposes. However, applications provided by payment services providers may rely on network connectivity for access to these monitoring or bookkeeping tools, particularly for authentication purposes. Network connectivity may not be available in all locations or at all times, for example, if a merchant or user is traveling by air or at a remote location.

Thus, there is a need for an improved system and method for providing offline access to transactional data and other information.

Figure 1:
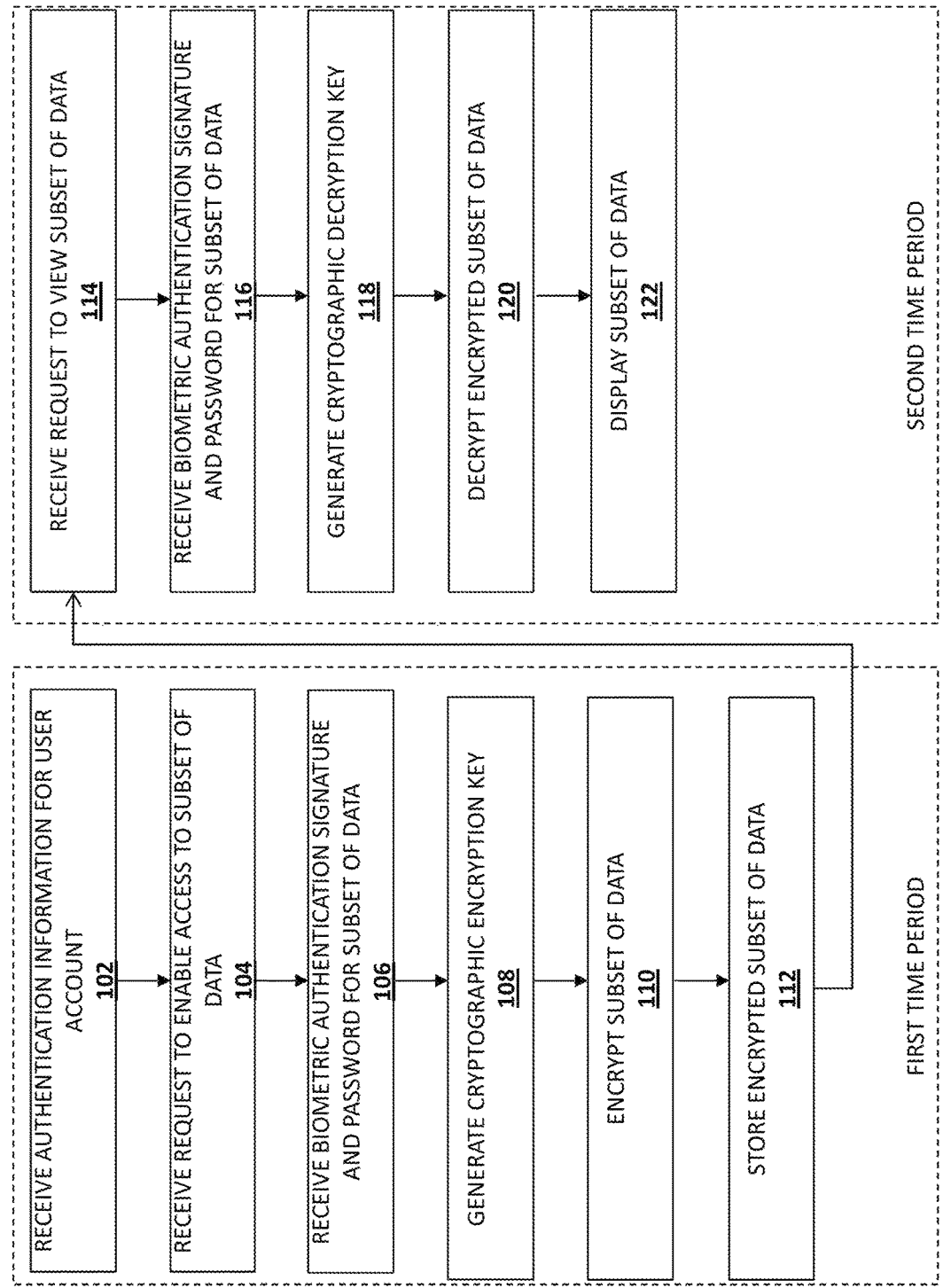
FIG. 1 is a flow chart illustrating an embodiment of a method for providing offline access to transactional data and other information.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for providing, by an application, disconnected or offline access to a subset of data associated with a user. The application may be executed by a mobile device having one or more biometric sensors, such as a fingerprint sensor, one or more hardware processors, a network interface, and a touch-sensitive display device. During a first time period (for example, when a device is connected to a network), authentication information corresponding to an account with a payment services provider is received using the touch-sensitive display device, and a request to enable access to a subset of data associated with the account is received. Using the one or more biometric sensors and touch-sensitive display device, a biometric authentication signature (such as a fingerprint) and password corresponding to the subset of data is received. The hardware processors generate a cryptographic authentication key based on the biometric authentication signature and the password corresponding to the subset of data, and encrypt the subset of data using the cryptographic authentication key to create an encrypted subset of data. The encrypted subset of data is stored in a non-transitory memory. During a second time period (for example, when a device is not connected to a network), a request to view the subset of data is received, and a biometric authentication signature and password are received. A cryptographic decryption key is generated based on the biometric authentication signature and the password, and decryption of the encrypted subset of data is performed using the cryptographic decryption key. The touch sensitive display device then displays the subset of data.

Referring now to FIG. 1, an embodiment of a method 100 for providing disconnected or offline access to a subset of data within an application on a mobile device with a touch-sensitive display device is described. In the embodiments and examples discussed below, system functionality is realized by an application provided by a payment services provider that may provide a user wallet functionality that allows the user to save one or more payment sources, payment instruments or other methods of payment, make payments to online and/or offline (e.g., brick-and-mortar) merchants using those payment instrument(s), transfer money to other users using those payment instrument(s), and/or provide other wallet functionality known in the art. However, the functionality described with respect to the embodiments disclosed herein is not limited to the aforementioned wallet functionality provided by the payment services provider, and instead may be implemented in other applications and uses such as, for example, a web browser, mapping applications, and/or other applications executed by a mobile device having a touch-sensitive display device.

Figure 2A:
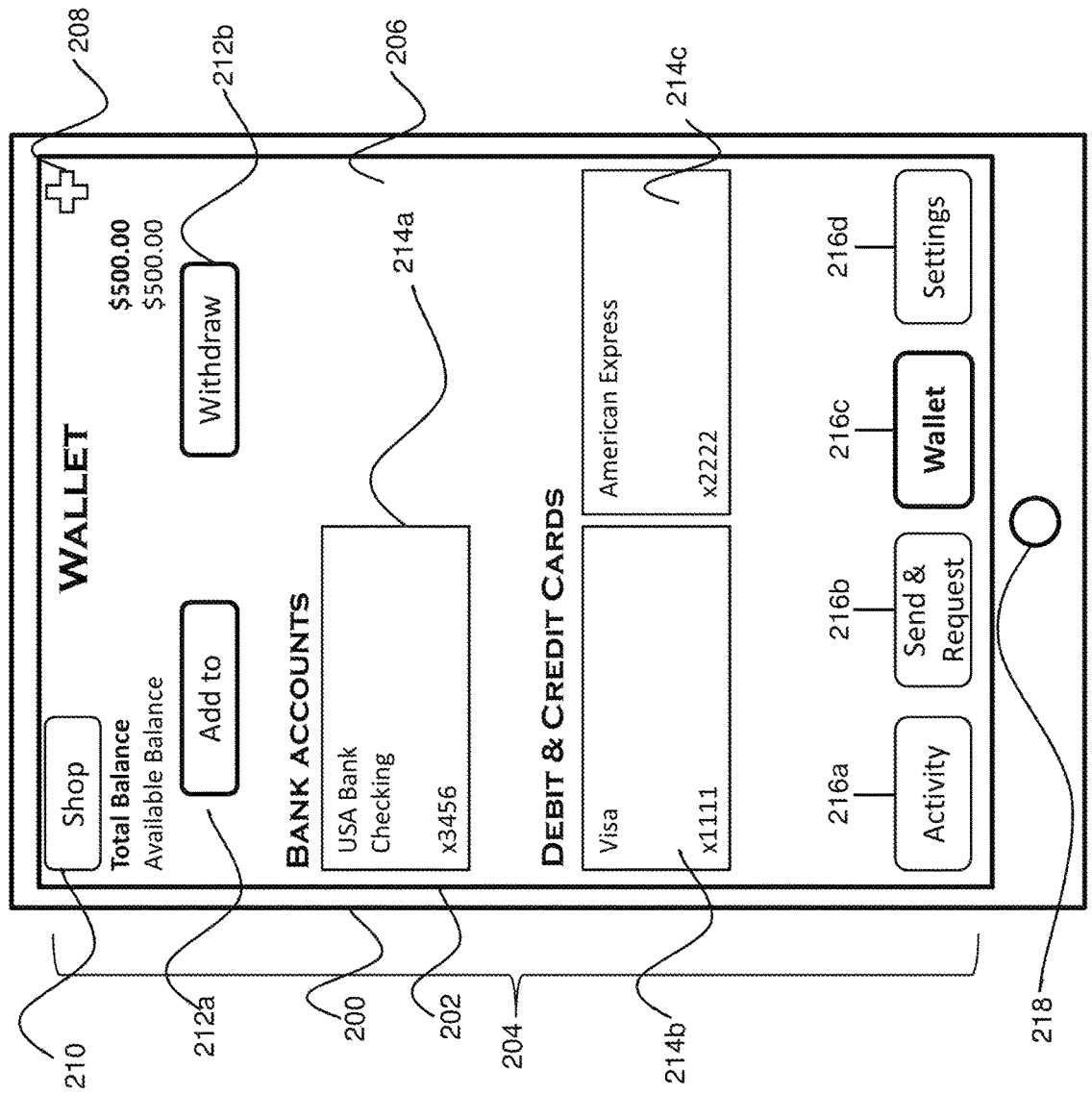
FIG. 2a is a front view illustrating an embodiment of a touch-sensitive display device on a payer device displaying a mobile application provided by a payment services provider.

Referring first to FIG. 2a, a payer device 200 or mobile device includes a display 202 displaying payment application screen 204 that provides wallet functionality 206 of the payment application. As discussed above the payment application may be provided by a payment services provider, such as PayPal Inc. of San Jose, CA, and the payer associated with the payer device may have a payment account with the payment services provider that allows the payer to access one or more financial accounts or payment sources for making payments to merchants or other users (e.g., credit financial accounts, banking financial accounts, virtual currency financial accounts, etc.). The display 202 is a touch-sensitive or gesture-detecting display device, and may include multi-touch display device functionality that is capable of detecting multiple inputs at once from a user. The wallet functionality 206 of the payment application provides various functions, just a few of which are illustrated in FIG. 2a. For example, the wallet functionality 206 provides the current balance of the user's account with the payment services provider (e.g., $500 in the illustrated embodiment), and further provides a button 212a to allow the user to add funds to his or her account with the payment services provider (e.g., via a transfer from a financial account), and a button 212b to allow the user to withdraw funds from the account with the payment services provider (e.g., to a financial account or other user). Additionally, the wallet functionality 206 provides the financial accounts or payment sources associated with the user's account information, such as a bank account 214a, and credit cards 214b and 214c. The wallet functionality 206 also includes a button 208 to allow the user to add a new account, funding source, or payment source, such as a credit card, debit card, store loyalty card, gift card, bank account, virtual currency account, or other financial account to the user's account with the payment services provider. The wallet functionality 206 also provides a "shop" button 210 that may allow the user to purchase items from a merchant with the funds in the user's account with the payment services provider. As shown in FIG. 2a, the payment application provided by the payment services provider may include other functionality accessible by buttons 216a-216d. For example, button 216a may allow the user to view his or her activity with the payment services provider and/or financial accounts, for example, transaction history data, button 216b may allow the user to send or request money from another user, button 216c (which is indicated as selected in FIG. 2a) provides access to the wallet functionality described above, and button 216d may allow the user to view and edit his or her settings or account information with the payment services provider. The payer device 200 also includes a biometric sensor, such as a fingerprint sensor 218.

Method steps 102 through 112 of method 100 occur during a first time period. The method 100 begins at block 102 where authentication information corresponding to an account of the user with a payment services provider is received. In one embodiment, the authentication information is a combination of a username and password, or any other authentication information, such as an e-mail address (which may serve as a username), personal identification number, secret image, or other such authentication information. In one embodiment, the authentication information is received using a touch-sensitive display device. For example, the user may utilize a software keyboard displayed on the screen of the mobile device to enter in a username and password. In one embodiment, the authentication information may be received using a hardware keyboard connected to the payer device 200 or mobile device using a cable or wirelessly.

Figure 2B:
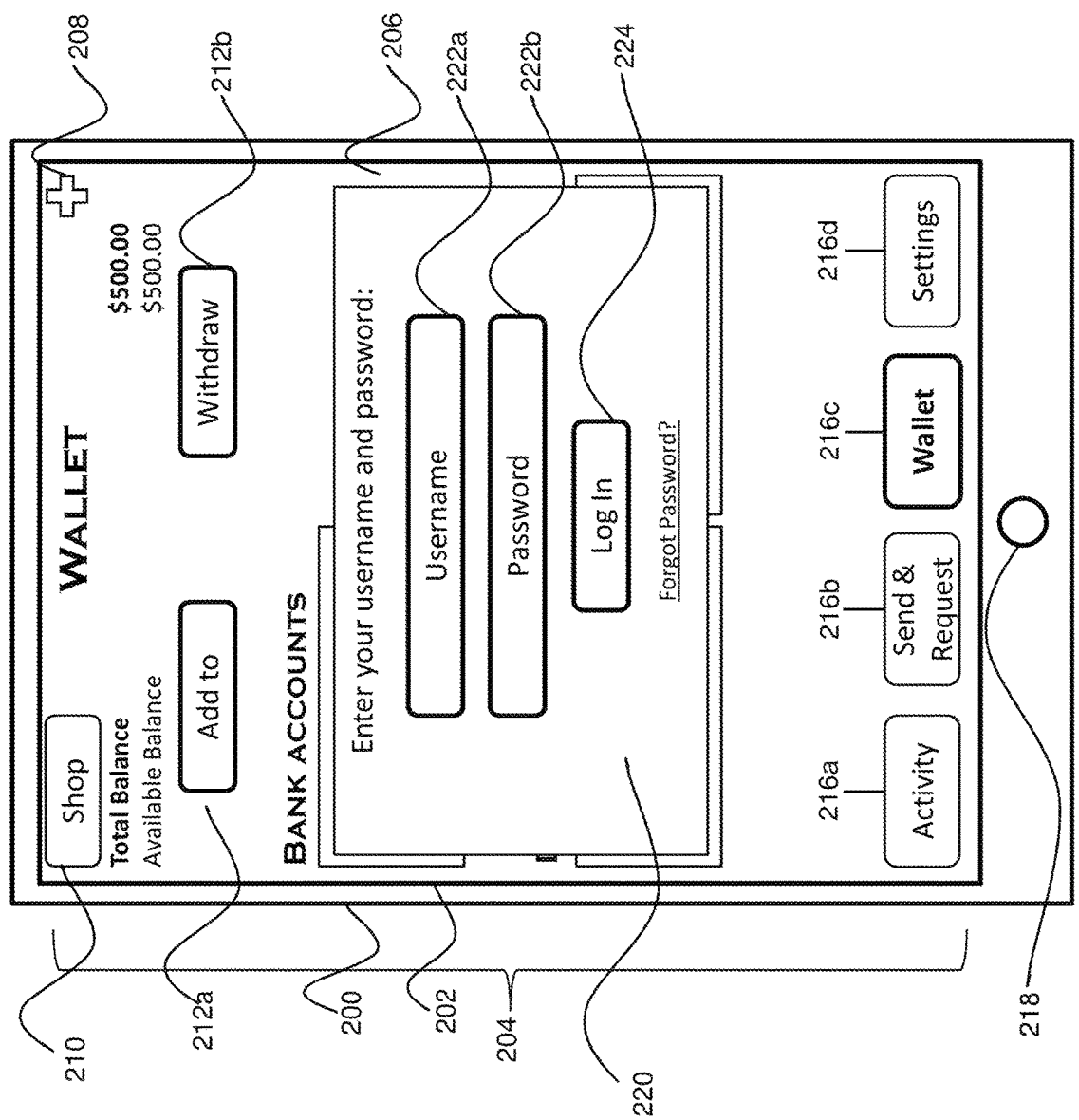
FIG. 2b is a front view illustrating an embodiment of a touch-sensitive display device on a payer device displaying a mobile application provided by a payment services provider with a window requesting authentication information.

To view and utilize the wallet functionality of the payment application, a user typically must enter or provide a username and password, or other authentication data, to the application. Referring to FIG. 2b, an authentication window or pop-up 220 displays fields for a user to enter his or her username and password 222a and 222b, and submit the data to the application for authentication. In one embodiment, the authentication window 220 appears before the user can view the wallet functionality 206 referred to in FIG. 2a. In one embodiment, the authentication screen 220 appears after the user has viewed the wallet functionality 206, but before the user can utilize any of the functions within the wallet functionality. For example, the authentication window 220 may appear when the user tries to select the "Withdraw" button 212b or the "Shop" button 210. Once the user enters a username and password in fields 222a and 222b, respectively, the user may select, using the display 202, the "Log In" button 224, to attempt authentication with the payment services provider. Attempting authentication with the payment services provider usually requires a network connection (e.g., a connection to the Internet), which is used to transmit the authentication credentials to the payment services provider, where the authentication credentials are verified. In one embodiment, the authentication credentials are transmitted using a secure or encrypted network connection, for example, transmitted using a secure hypertext transfer protocol (e.g., HTTPS). Upon successful verification, the payment services provider transmits, using the network connection, an indication of the successful verification via a network, which the payment application receives to allow the user to utilize the wallet functionality or other functionality of the payment application.

Upon successful authentication with the payment services provider, method 100 then proceeds to block 104. At block 104, a request to enable access to a subset of data associated with the account with the payment services provider is received. In one embodiment, the request is received using the touch-sensitive display device of the payer device or mobile device 200. In one embodiment, and in the examples and embodiments described herein, the subset of data is the user's transaction history with the payment services provider. In one embodiment, the subset of data is all of the data in the user's transaction history. In one embodiment, the subset of data is only a portion of the user's transaction history. It should be understood that the subset of data is not limited to transaction history data, but may be any other data associated with a user's account with a payment services provider.

Figure 2C:
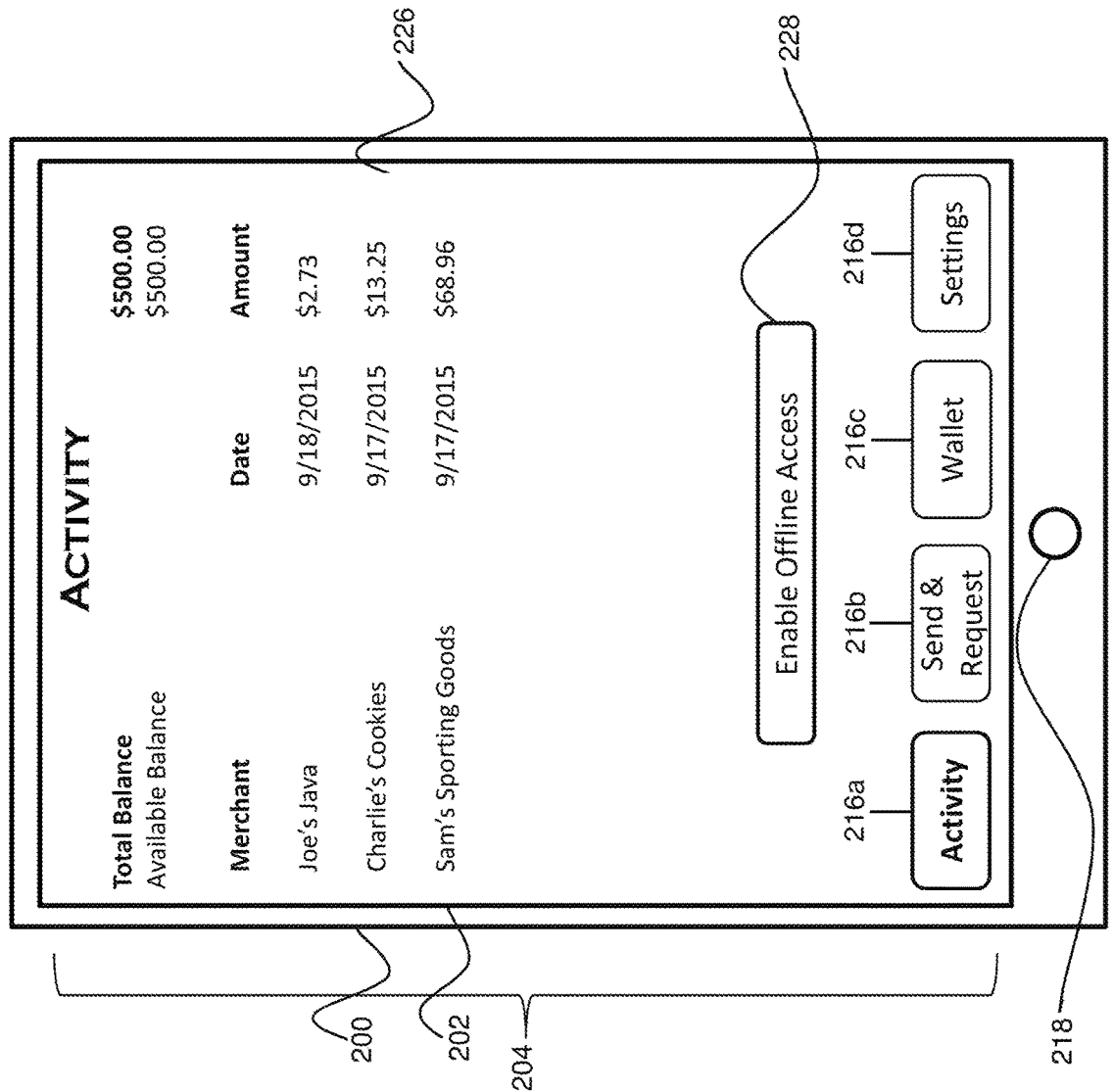
FIG. 2c is a front view illustrating an embodiment of a touch-sensitive display device on a payer device displaying a mobile application provided by a payment services provider with transactional history data.

Referring now to FIG. 2c, upon selection of the button 216a by the user, for example, the user may be presented with his or her transaction history with the payment services provider, displayed by the transaction history functionality 226 of the payment application. In one embodiment, if the user is a merchant, the user may be presented with a list of transactions performed by users using the payment services provider to effectuate payment. The transaction history may include transactional data for each transaction in which the user utilized the payment services provider to pay for goods or services at a merchant, or receive money from friends or customers. In one embodiment, the transaction history functionality 226 presented upon selection of button 216a includes a button 228 or other control which can be activated by the user, by interacting with the touch-sensitive display of the payer device 200, to enable access (including offline access) to the transactional data.

In one embodiment, enabling access to the transactional data permits access to all of the user's transactional data. In one embodiment, access to the transactional data is limited by the payment services provider to transactions occurring within the last week, month, or other time period. In one embodiment, the user may configure how many transactions to enable access to, whether limited by time period, number of transactions, or type of transaction (e.g., money sending, purchase transactional data, etc.). In one embodiment, the user may configure various criteria to limit access to transactions.

The method 100 then proceeds to block 106, where a biometric authentication signature and a password corresponding to the subset of data are received. In one embodiment, the biometric authentication signature is a fingerprint, received by a fingerprint reader or sensor 218 which is part of the payer device 200. In one embodiment, the biometric authentication signature may be an audio passphrase spoken by the user into a microphone or other audio receiving component which is part of or connected to the payer device. In one embodiment, the biometric authentication signature may be a retinal scan performed by a camera or other image recognition component of the payer device. In one embodiment, the biometric authentication signature may include capturing features of the user's face for facial recognition techniques. In one embodiment, the password corresponding to the subset of data is the same password as the user's authentication data used to authenticate with the payment services provider. In one embodiment, the password is a different password. The payment application or payment services provider may recommend a different password, and may enforce criteria for the password used to enable access to the subset of data. For example, in one embodiment, the password used to authenticate with the payment services provider may be a first length, or a first number of characters (e.g., 10 characters), while the password used to enable access to the transactional data is a second number of characters (e.g., 6 characters). In one embodiment, the payment services provider may impose other requirements of the password as well, such as a requirement to use a mix of capital and lowercase letters, numbers, special characters, or other requirements.

Figure 2D:
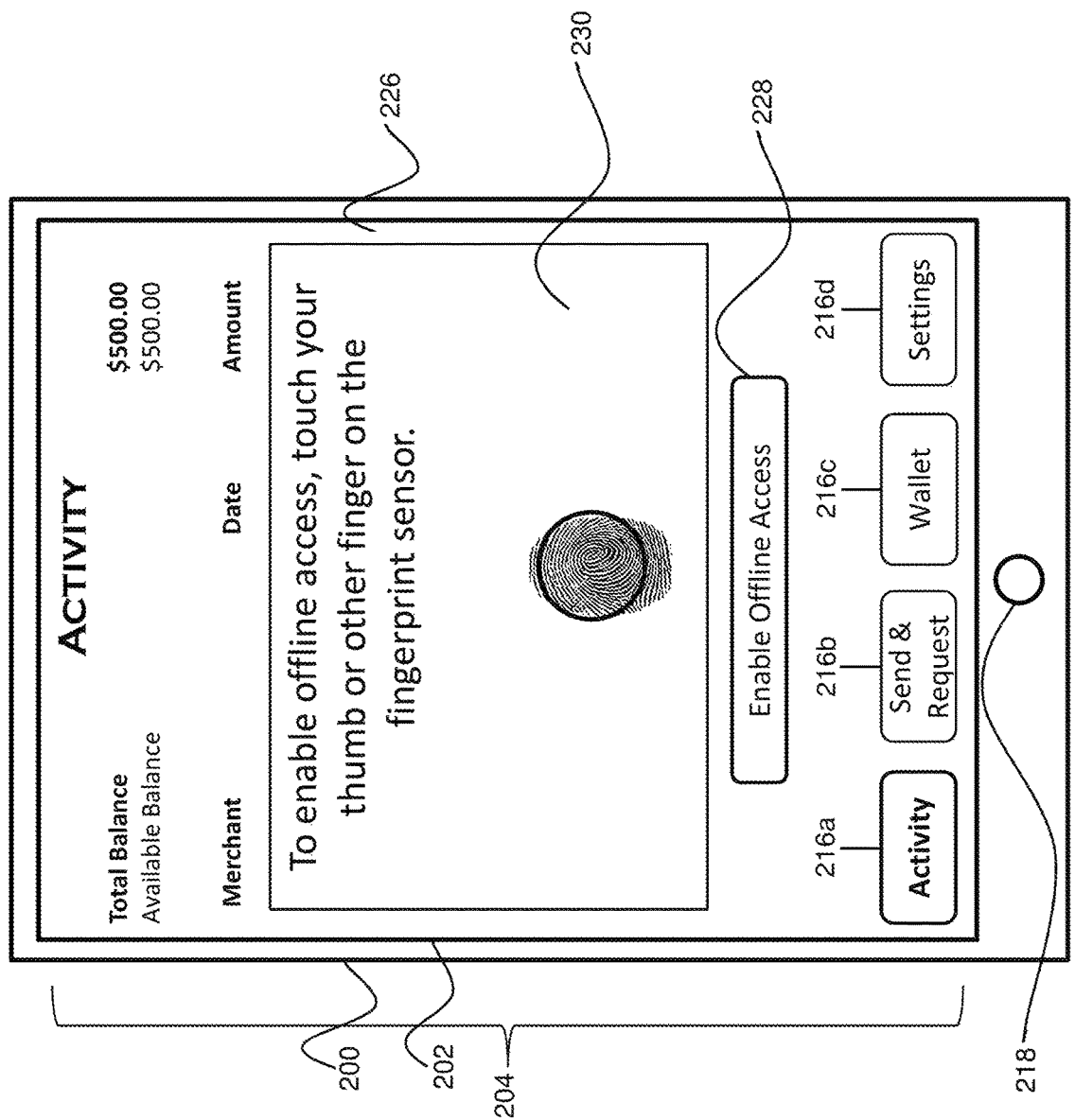
FIG. 2d is a front view illustrating an embodiment of a touch-sensitive display device on a payer device displaying a mobile application provided by a payment services provider with a request for a biometric authentication signature, such as a fingerprint.

Referring now to FIG. 2d, selection or activation of the button 228 may present the user with a window 230 that instructs the user to, as described with reference to one embodiment, provide his or her fingerprint or other biometric authentication signature. For example, the user may be asked to press his or her finger on the fingerprint reader 218. In response, the application may capture the fingerprint and store a representation of the fingerprint on the payer device. For example, in one embodiment, the application may convert the captured fingerprint or other biometric authentication signature into a mathematical representation of the signature (e.g., a mathematical representation of the arches and other details of a fingerprint), and store the representation on the payer device. In one embodiment, the biometric authentication signature or representation is transmitted to the payment services provider. In one embodiment, the biometric authentication signature or representation is not transmitted to the payment services provider, and is maintained on the payer device itself. In one embodiment, the biometric authentication signature or representation is stored in a secure memory location on the payer device.

Figure 2E:
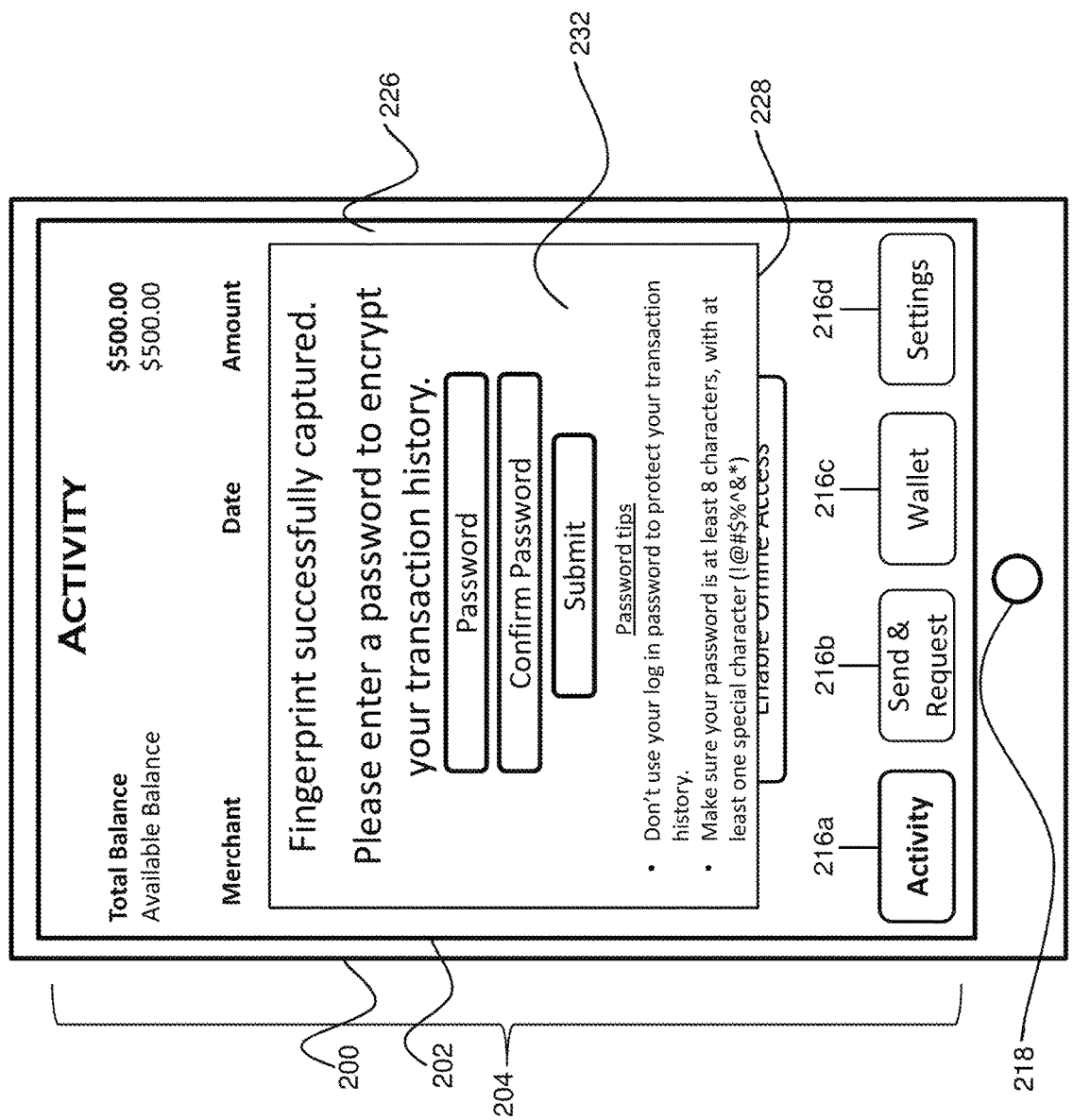
FIG. 2e is a front view illustrating an embodiment of a touch-sensitive display device on a payer device displaying a mobile application provided by a payment services provider with a request for a password.

Referring now to FIG. 2e, after the user has provided his or her biometric authentication signature, as described with reference to FIG. 2d, the user may be presented with a window 232 that instructs the user to provide a password to secure the transaction history information. In one embodiment, the window 232 includes an instruction to the user to select a different password than that used to authenticate with the payment services provider as described above with reference to block 102. In one embodiment, the user may be asked to enter a numeric-only passcode, for example, to differentiate between the password for the payment services provider and the data used to secure the transaction history. In one embodiment, the password for securing the transaction history information is required to be of a particular length, such as eight characters, while the password for authenticating with the payment services provider is required to be longer, such as twelve characters. In one embodiment, the password for securing the transaction history information is longer than the password for authenticating with the payment services provider. In one embodiment, the password, or a representation of the password (e.g., a hash of the password) is then stored on the payer device. In one embodiment, the password or representation is transmitted to the payment services provider.

The method 100 then proceeds to block 108, where a cryptographic encryption key is generated, based on the biometric authentication signature and the password as the seed to a key generation algorithm. In one embodiment, the key generation algorithm may be received from the payment services provider or may be part of the payment application itself. In one embodiment, the key generation algorithm is modified periodically. In one embodiment, the key generation algorithm may be a cryptographically secure pseudo-random number generator which uses the representation of the biometric authentication signature and the password for securing the transaction history data as a seed. For example, a cryptographic hash function, a block cipher, or a stream cipher may be used to generate the key. In one embodiment, other key generation algorithms can be used as well.

Figure 2F:
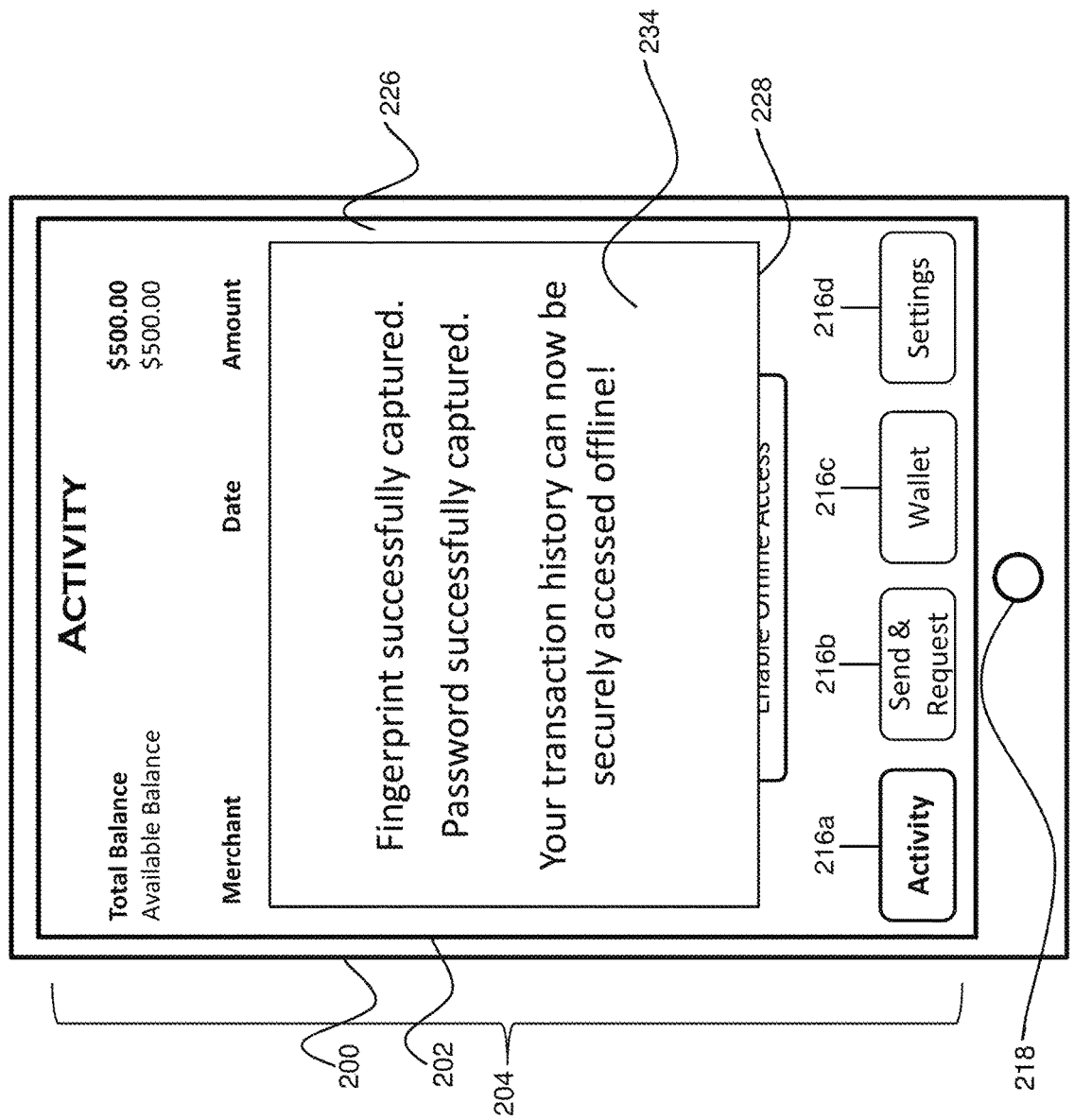
FIG. 2f is a front view illustrating an embodiment of a touch-sensitive display device on a payer device displaying a mobile application provided by a payment services provider with a confirmation of fingerprint and password capture.

The method 100 then proceeds to block 110, where the subset of data is encrypted using the cryptographic encryption key. Encryption of the subset of data creates an encrypted subset of data. In one embodiment, a symmetric-key algorithm is used to encrypt the subset of data. For example, an Advanced Encryption Standard (AES) symmetric-key algorithm may be used to encrypt the subset of data, using the cryptographic key generated at block 108. The method 100 then proceeds to block 112, where the encrypted subset of data is stored in a memory of the payer device. In one embodiment, the payment application displays a confirmation screen, such as the confirmation screen depicted in FIG. 2f, with a window 234, to inform the user of successful encryption and storing of the transaction history data. Method 100 then proceeds to block 114.

Method steps 114 through 122 of method 100 occur during a second time period. In one embodiment, during the second time period, the payer device 200 may not be connected to a network using a network component or network interface. At block 114, a request to view the subset of data is received. In one embodiment, the request is received using the touch-sensitive display of the payer device 200. For example, the user may select button 216a as described above to view the user's transaction history.

Figure 2G:
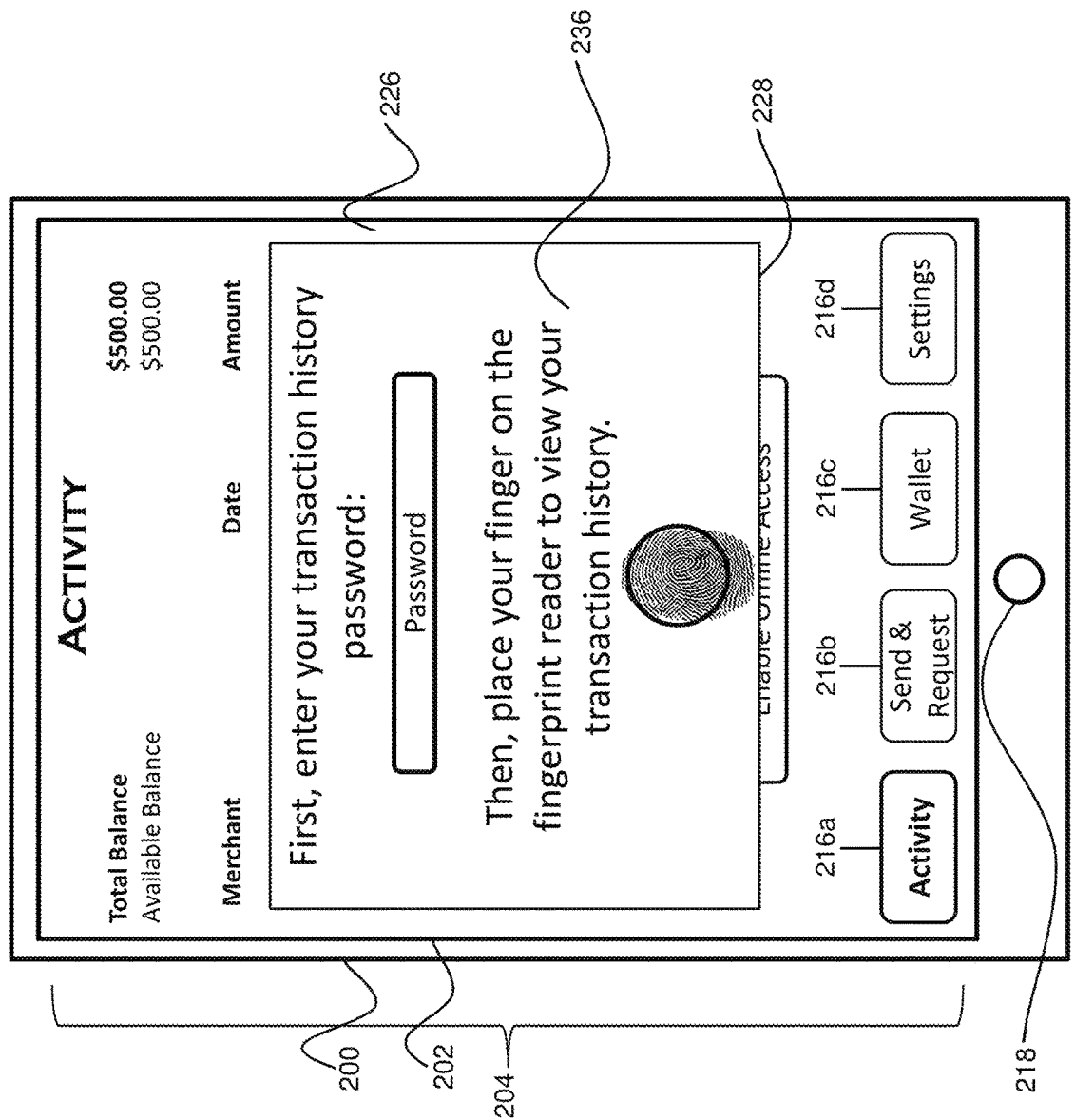
FIG. 2g is a front view illustrating an embodiment of a touch-sensitive display device on a payer device displaying a mobile application provided by a payment services provider with a request to provide a biometric authentication signature and password.

Referring now to FIG. 2g, in response to receiving the request to view the subset of data, the payer device may detect that it is not connected to a network, or alternatively, the payer device may detect that authentication to the payment services provider has not occurred. The payer device may then display an authentication screen, as shown in FIG. 2g. The display of FIG. 2g includes a window 236 which instructs the user to enter in the password, and provide the biometric authentication signature, for example, by placing the user's finger on the fingerprint sensor, speaking the audio passphrase, or focusing a camera of the payer device on the user's retina for a retinal scan. In one embodiment, receipt of the biometric authentication signature and password occurs in two separate screens or displays, as described above with reference to FIGS. 2d and 2e. Method 100 then proceeds to block 116, where the biometric authentication signature and password are received.

At block 118 of method 100, a cryptographic decryption key based on the entered biometric authentication signature and password is generated. The same key generation technique is used as described above, for example, a cryptographically secure pseudorandom number generator is used to generate the cryptographic decryption key, using the biometric authentication signature and password (or representation of the signature and password).

Figure 2H:
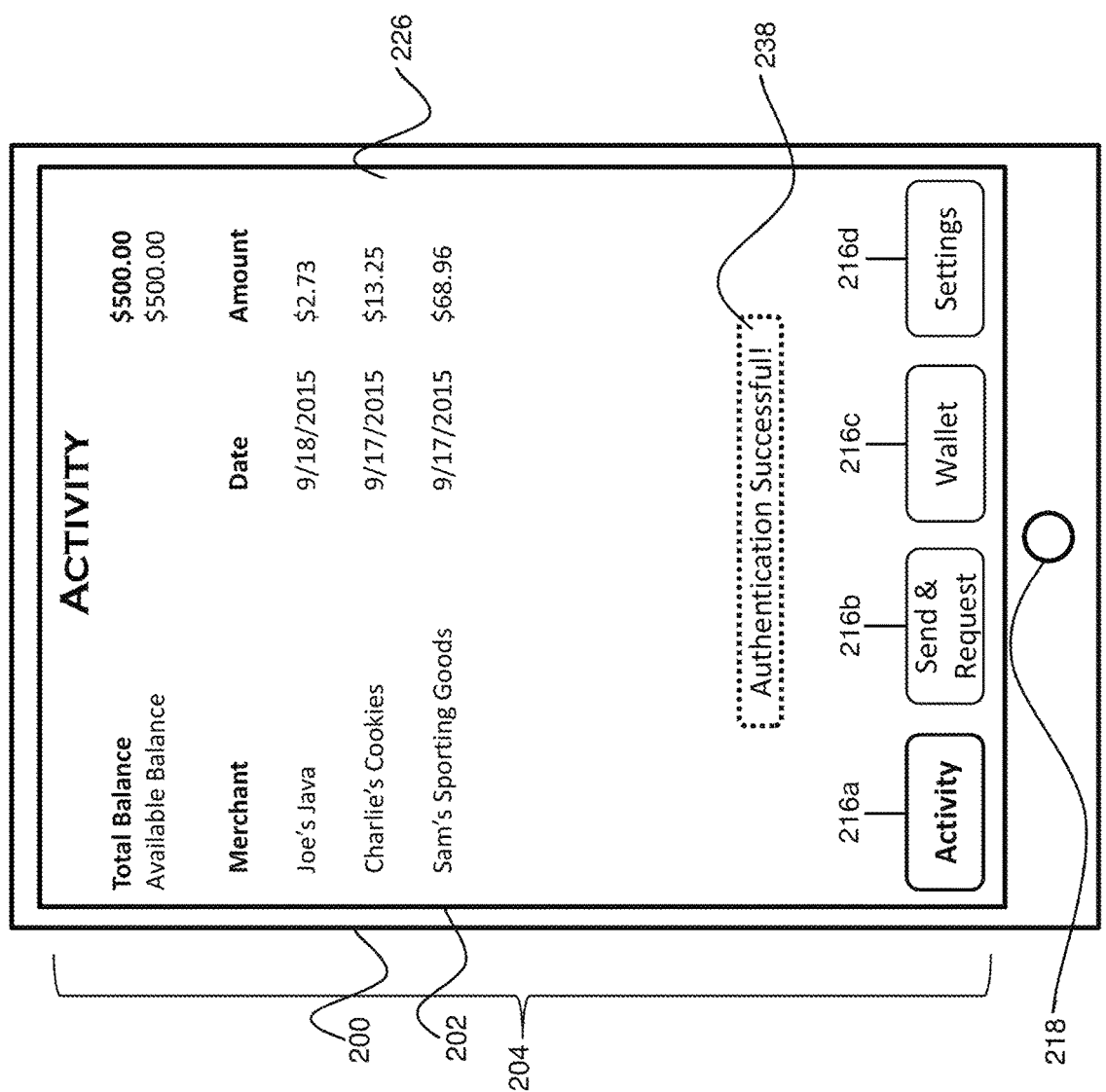
FIG. 2h is a front view illustrating an embodiment of a touch-sensitive display device on a payer device displaying a mobile application provided by a payment services provider with transactional history data and an indication of successful authentication.

At block 120 then, decryption of the encrypted subset of data is attempted using the cryptographic decryption key. For example, the cryptographic decryption key is used with a symmetric-key algorithm to attempt decryption of the encrypted subset of data. If decryption is successful, method 100 proceeds to block 122, where the subset of data is displayed on the touch-sensitive display device. Referring to FIG. 2h, the payer device may then display the user's transaction history data, with a display element, such as display element 238, indicating a successful authentication.

Depending on the algorithm used, decryption may only be successful if the cryptographic encryption key described with reference to block 108 is the same as the cryptographic decryption key described with reference to block 118. In one embodiment, decryption is determined to be successful if the data, after decryption is attempted, is readable by the payment application. For example, if the data can be properly parsed and rendered for display by the payment application, the decryption may be determined to be successful. In one embodiment, if decryption is determined to be unsuccessful, for example, if the decrypted data cannot be parsed, an error may be detected, and the user may be asked to re-enter the biometric authentication signature and/or password.

In one embodiment, the user may choose to encrypt other data using the biometric authentication signature and password combination, which may then be used at a later time when the payer device is not connected to a network. For example, in one embodiment, a request to authorize a payment token corresponding to the user's account with the payment services provider may be received. In one embodiment, the user may activate an option within the payment application to provide the request for the payment token. In one embodiment, the user may specify an amount for the payment token, a specified merchant for the payment token, an expiration date for the payment token, or any other details of the payment token. In one embodiment, the amount for the payment token may be deducted from the user's account balance with the payment services provider. In one embodiment, the amount for the payment token may not be deducted until the payment token is used. In one embodiment, if the amount for the payment token is not deducted until the payment token is used, the payment services provider ensures that the user has sufficient funds to be deducted in the future, or determines that the user is likely able to pay the amount corresponding to the payment token (e.g., by extending credit to the user, checking the user's credit score, etc.).

The payer device, or payment application, may then encrypt the authorized payment token using the cryptographic authentication key to create an encrypted authorized payment token. For example, the same cryptographic authentication key as described above may be used with a symmetric-key encryption algorithm to encrypt the payment token. The encrypted authorized payment token may then be stored on the payer device.

At a later time, for example, when the payer device is not connected to a network, the user may request to utilize the payment token, and may activate an option in the payment application to do so. In response, the payment application may prompt the user to enter a password and provide a biometric authentication signature. The payment application may then generate a cryptographic decryption key based on the biometric authentication signature and the password, and decrypt the encrypted authorized payment token using the decryption key. In response, the authorized payment token may be enabled for use. In one embodiment, enabling the authorized payment token for use may include displaying a barcode or 2-dimensional quick response (QR) code, which can be scanned by a point of sale device, such as a handheld terminal. In one embodiment, enabling the authorized payment token for use may include causing the payer device to wirelessly transmit the token using near-field communication, Bluetooth, or another wireless method of transmitting the token.

In one embodiment, depending on the risk associated with the payment token, or the risk associated with viewing or editing data, the payment application, or payment services provider, may enforce additional restrictions and safeguards for offline access of the same data. For example, if the payment token is to be authorized for a large amount of money, e.g., over $100, the payment services provider may require the password to be over 8 characters, or may require two methods of biometric authentication, such as a fingerprint and audio passphrase. In one embodiment, the payment services provider may set an expiration date or time on authorized payment tokens, to ensure that the payment tokens are not compromised. In one embodiment, modification of the key generation algorithm may be used to effectively "expire" encrypted authorized payment tokens. In one embodiment, when a payment token is expired, funds may be returned to a user's account with the payment services provider.

Thus, systems and methods have been described that provide for secure access to subsets of data without network connectivity. The systems and methods may, during a first time period in which a device is connected to a network such as the Internet, receive authentication information for an account with a payment services provider, and receive a request to enable access to a subset of data associated with the account. Using biometric sensors, a biometric authentication signature, such as a fingerprint, and a second password are received, and a cryptographic authentication key is generated for use with an encryption algorithm to encrypt the subset of data, which is then stored. At a later time, when the device is not connected to a network, the biometric authentication signature and password may be used to decrypt and view the subset of data. For example, a user may utilize an application provided by a payment services provider to pay for purchases while traveling for work, and may want to complete his or her expense reports while traveling back home. Access to his or her account activity would be particularly beneficial in such a situation, as the user would be able to access his or her account activity within the application without a network connection, but in a secure manner. Further, as the transaction data can only be enabled for offline viewing after the user is successfully authenticated with the payment services provider, the payment services provider can ensure that only authorized users are activating offline access to transaction history data.

Figure 3:
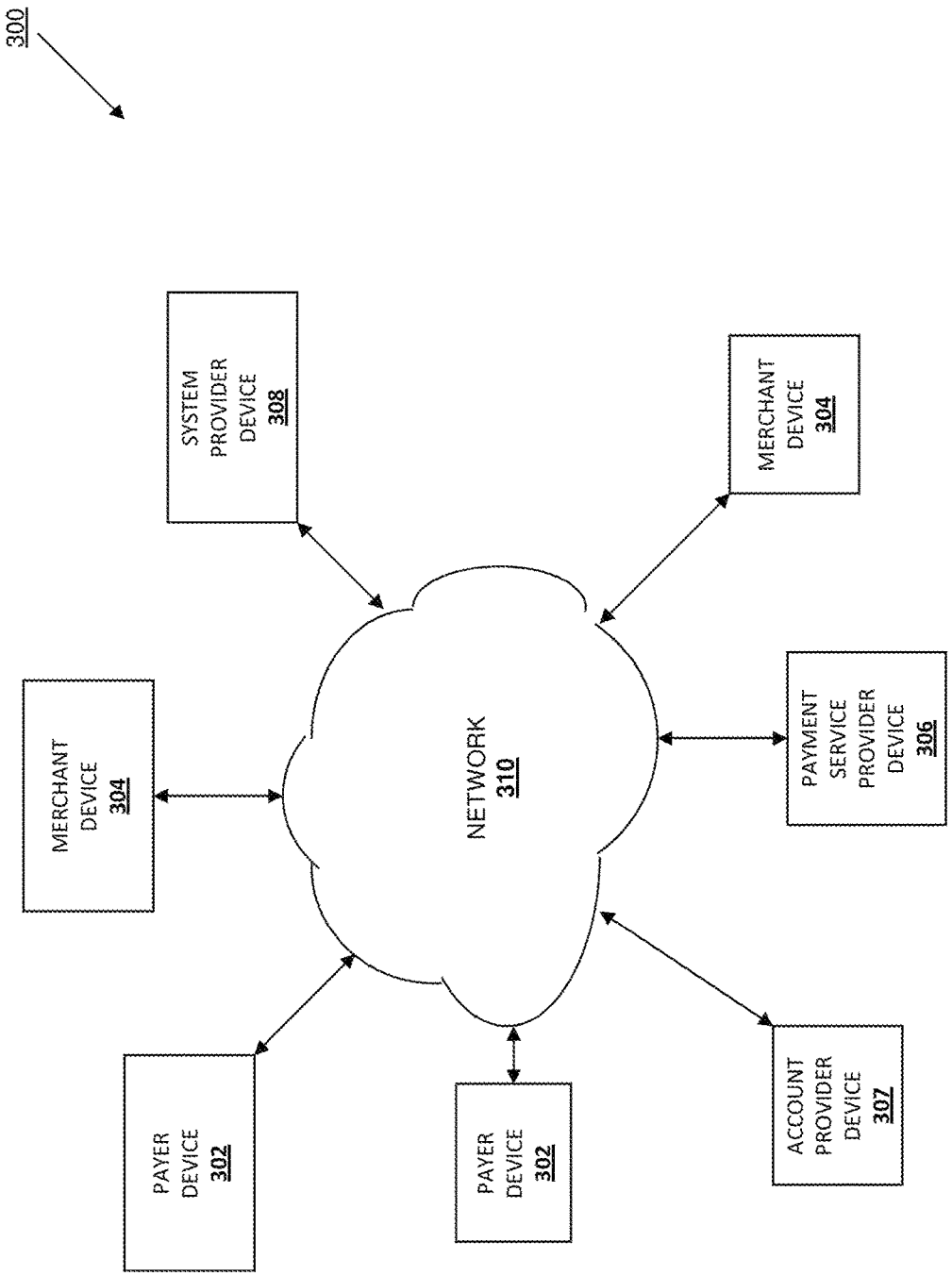
FIG. 3 is a schematic view illustrating an embodiment of a networked system.

Referring now to FIG. 3, an embodiment of a network-based system 300 for implementing one or more processes described herein is illustrated. As shown, network-based system 300 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 3 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 300 illustrated in FIG. 3 includes a plurality of payer devices 302, a plurality of merchant devices 304, a payment services provider device 306, an account provider device 307, and/or a system provider device 308, in communication over a network 310. Any of the payer devices 302 may be the payer device 200 operated by the users, discussed above. The merchant devices 304 may be the merchant devices discussed above and may be operated by the merchants discussed above. The payment services provider device 306 may be the payment services provider devices discussed above and may be operated by a payment services provider such as, for example, PayPal Inc. of San Jose, CA. The account provider devices 307 may be the account provider devices discussed above and may be operated by the account providers discussed above such as, for example, credit card account providers, bank account providers, savings account providers, and a variety of other account providers known in the art. The system provider device 308 may be the system provider devices discussed above and may be operated by the system providers discussed above.

The payer devices 302, merchant devices 304, payment services provider device 306, account provider device 308, and/or system provider device 308 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 300, and/or accessible over the network 310.

The network 310 may be implemented as a single network or a combination of multiple networks. For example, in various embodiments, the network 310 may include the Internet and/or one or more intranets, landline networks, wireless networks, and/or other appropriate types of networks.

The payer device 302 may be implemented using any appropriate combination of hardware and/or software configured for wired and/or wireless communication over network 310. For example, in one embodiment, the payer device 302 may be implemented as a personal computer of a user in communication with the Internet. In other embodiments, the payer device 302 may be a smart phone, personal digital assistant (PDA), laptop computer, and/or other types of computing devices.

The payer device 302 may include one or more browser applications which may be used, for example, to provide a convenient interface to permit the payer to browse information available over the network 310. For example, in one embodiment, the browser application may be implemented as a web browser configured to view information available over the Internet.

The payer device 302 may also include one or more toolbar applications which may be used, for example, to provide user-side processing for performing desired tasks in response to operations selected by the payer. In one embodiment, the toolbar application may display a user interface in connection with the browser application.

The payer device 302 may further include other applications as may be desired in particular embodiments to provide desired features to the payer device 302. In particular, the other applications may include a payment application for payments assisted by a payment services provider through the payment services provider device 306. The other applications may also include security applications for implementing user-side security features, programmatic user applications for interfacing with appropriate application programming interfaces (APIs) over the network 310, or other types of applications. Email and/or text applications may also be included, which allow the payer to send and receive emails and/or text messages through the network 310. The payer device 302 includes one or more user and/or device identifiers which may be implemented, for example, as operating system registry entries, cookies associated with the browser application, identifiers associated with hardware of the payer device 302, or other appropriate identifiers, such as a phone number. In one embodiment, the user identifier may be used by the payment services provider device 306 and/or account provider device 307 to associate the user with a particular account as further described herein.

The merchant device 304 may be maintained, for example, by a conventional or on-line merchant, conventional or digital goods seller, individual seller, and/or application developer offering various products and/or services in exchange for payment to be received conventionally or over the network 310. In this regard, the merchant device 304 may include a database identifying available products and/or services (e.g., collectively referred to as items) which may be made available for viewing and purchase by the payer.

The merchant device 304 also includes a checkout application which may be configured to facilitate the purchase by the payer of items. The checkout application may be configured to accept payment information from the user through the payer device 302, the account provider through the account provider device 307, and/or from the payment services provider through the payment services provider device 306 over the network 310.

Figure 4:
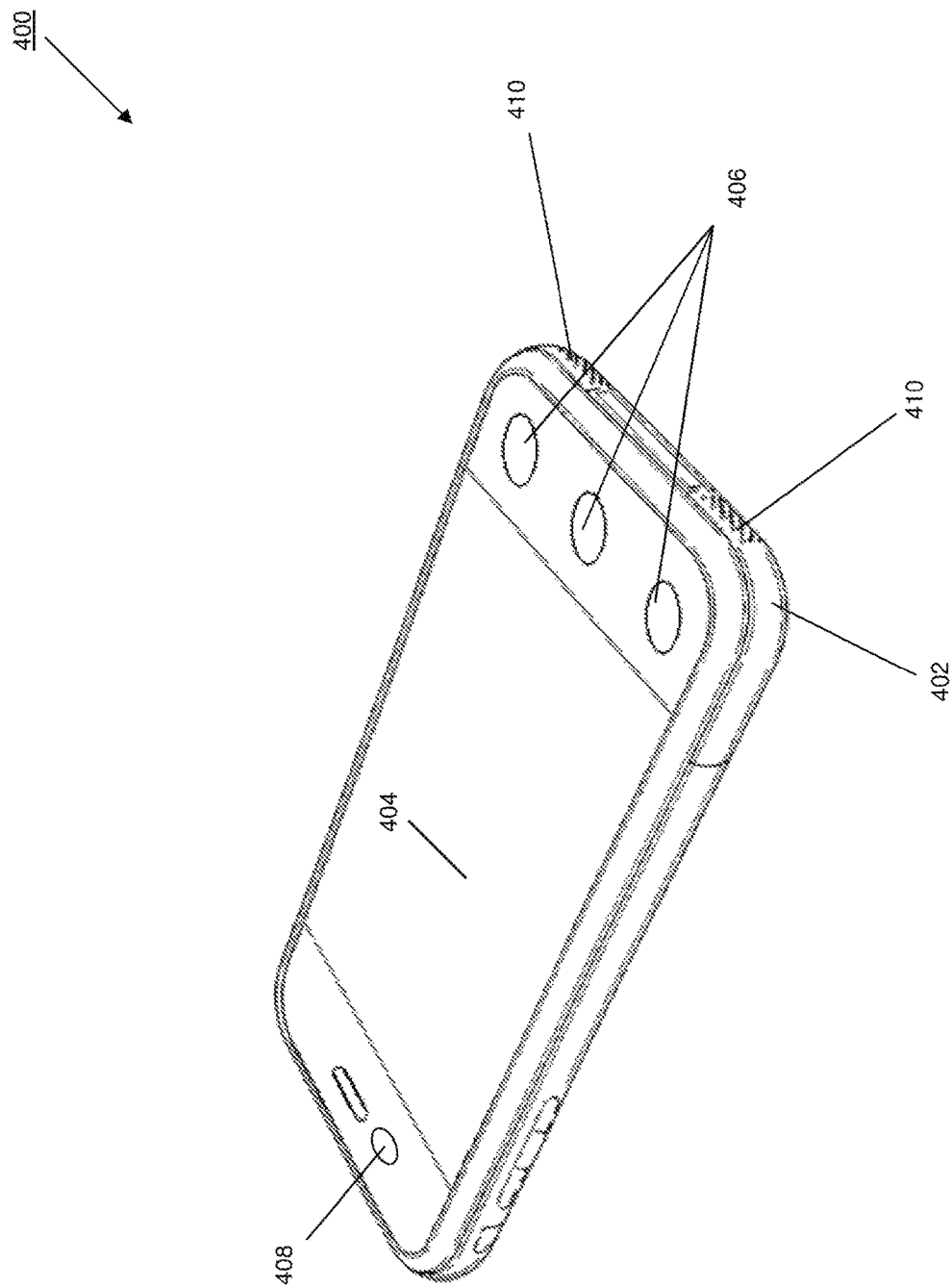
FIG. 4 is a perspective view illustrating an embodiment of a payer device.

Referring now to FIG. 4, an embodiment of a payer device 400 is illustrated. The payer device 400 may be the payer devices 200 and/or 302. The payer device 400 includes a chassis 402 having a display 404 and an input device including the display 404 and a plurality of input buttons 406. The payer device 400 further includes a camera 408 and one or more audio input/output devices (e.g., microphones, speakers) 410. One of skill in the art will recognize that the payer device 400 is a portable or mobile phone including a touch screen input device and a plurality of input buttons that allow the functionality discussed above with reference to the method 100. However, a variety of other portable/mobile payer devices and/or desktop payer devices may be used in the method 100 without departing from the scope of the present disclosure.

Figure 5:
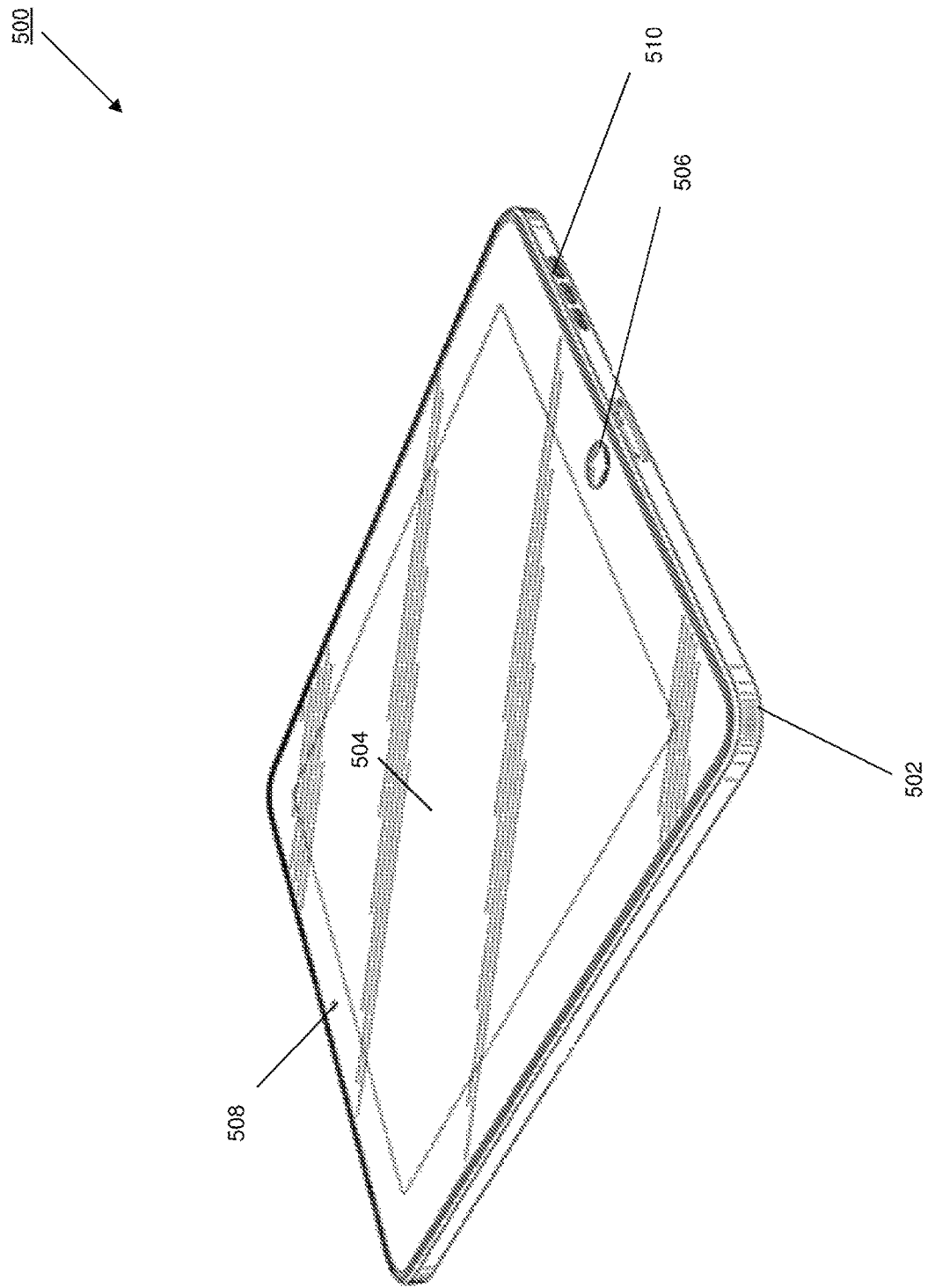
FIG. 5 is a perspective view illustrating a further embodiment of a payer device.

Referring now to FIG. 5, a further embodiment of a payer device 500 is illustrated. The payer device 400 may be the payer devices 200 and/or 302. The payer device 500 includes a chassis 502 having a display 504 and an input device including the display 504. The payer device 500 may also include an input button 406 and one or more audio input/output device 508 (e.g. microphones, speakers). One of skill in the art will recognize that the payer device 500 is a portable or mobile table device including a touch screen input device and a plurality of input buttons that allow the functionality discussed above with reference to the method 100. However, a variety of other portable/mobile payer devices and/or desktop payer devices may be used in the method 100 without departing from the scope of the present disclosure.

Figure 6:
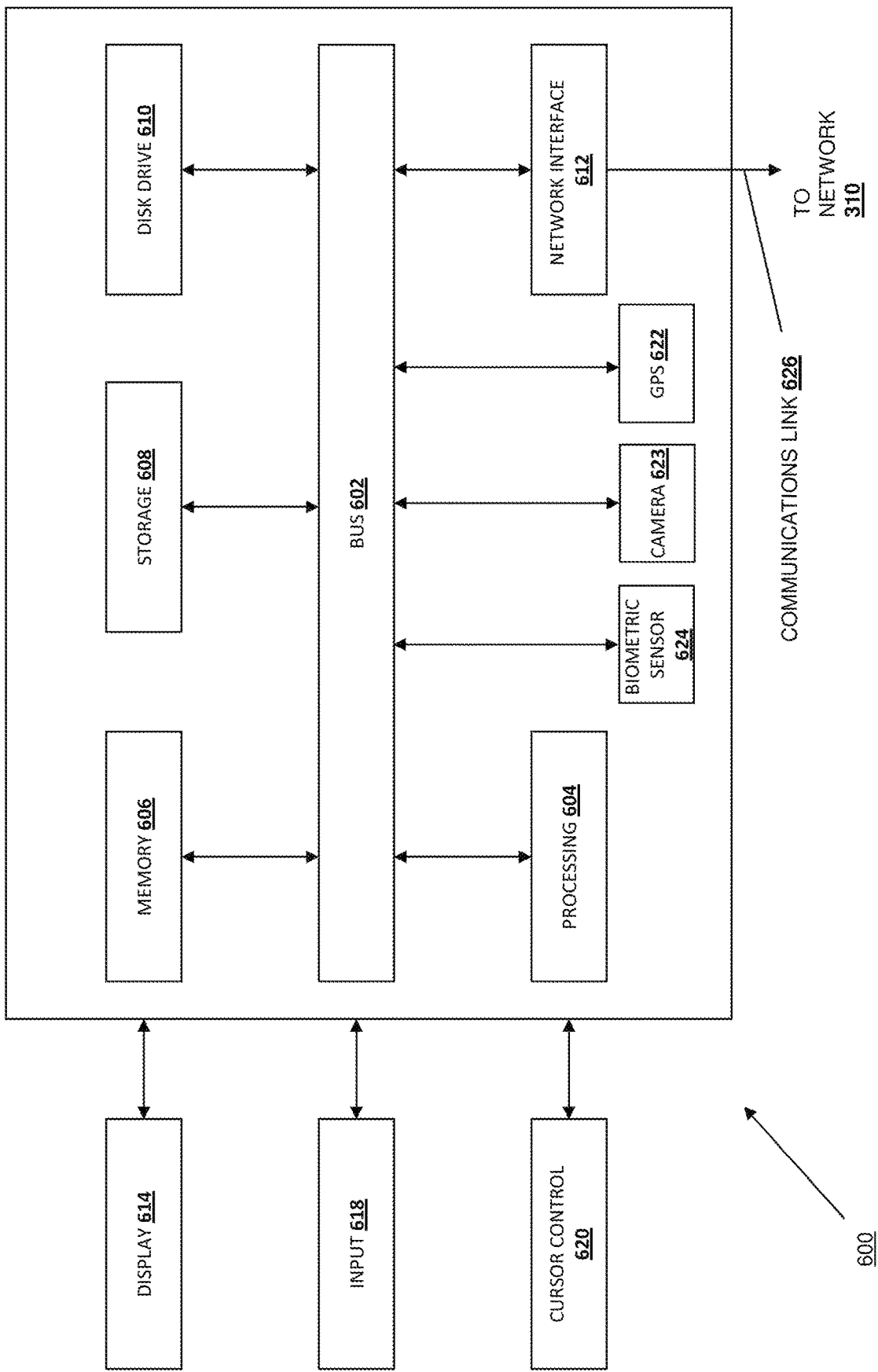
FIG. 6 is a schematic view illustrating an embodiment of a computer system.

Referring now to FIG. 6, an embodiment of a computer system 600 suitable for implementing, for example, the payer device 200, the payer device 302, the payer device 400, the payer device 500, the merchant devices 304, the payment services provider device 306, the account provider device 307, and/or the system provider device 308, is illustrated. It should be appreciated that other devices utilized by payers, merchants, payment services providers, account providers, and system providers in the system discussed above may be implemented as the computer system 600 in a manner as follows.

In accordance with various embodiments of the present disclosure, computer system 600, such as a computer and/or a network server, includes a bus 602 or other communication mechanism for communicating information, which interconnects subsystems and components, such as a processing component 604 (e.g., processor, micro-controller, digital signal processor (DSP), etc.), a system memory component 606 (e.g., RAM), a static storage component 608 (e.g., ROM), a disk drive component 610 (e.g., magnetic or optical), a network interface component 612 (e.g., modem or Ethernet card), a display component 614 (e.g., CRT, LCD, touch-sensitive display device, etc.), an input component 618 (e.g., keyboard, keypad, virtual keyboard, touch-sensitive display device), a cursor control component 620 (e.g., mouse, pointer, or trackball), a location determination component 622 (e.g., a Global Positioning System (GPS) device as illustrated, a cell tower triangulation device, a Wi-Fi triangulation device, a Bluetooth-based location device, and/or a variety of other location determination devices known in the art), and/or a camera device 623. The computer system 600 may also include a biometric sensor component 624, which may include a fingerprint sensor with associated software, facial recognition hardware and/or software, retinal detection hardware and/or software, or audio analysis hardware and/or software. In one implementation, the disk drive component 610 may comprise a database having one or more disk drive components.

In accordance with embodiments of the present disclosure, the computer system 600 performs specific operations by the processor 604 executing one or more sequences of instructions contained in the memory component 606, such as described herein with respect to the payer devices 200, 302, 400 and 500, the merchant device(s) 304, the payment services provider device 306, the account provider device(s) 307, and/or the system provider device 308. Such instructions may be read into the system memory component 606 from another computer readable medium, such as the static storage component 608 or the disk drive component 610. In other embodiments, hard-wired circuitry may be used in place of or in combination with software instructions to implement the present disclosure.

Logic may be encoded in a computer readable medium, which may refer to any medium that participates in providing instructions to the processor 604 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 610, volatile media includes dynamic memory, such as the system memory component 608, and transmission media includes coaxial cables, copper wire, and fiber optics, including wires that comprise the bus 602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 600. In various other embodiments of the present disclosure, a plurality of the computer systems 600 coupled by a communication link 626 to the network 310 (e.g., such as a LAN, WLAN, PTSN, and/or various other wired or wireless networks, including telecommunications, mobile, and cellular phone networks) may perform instruction sequences to practice the present disclosure in coordination with one another.

The computer system 600 may transmit and receive messages, data, information and instructions, including one or more programs (i.e., application code) through the communication link 626 and the network interface component 612. The network interface component 612 may include an antenna, either separate or integrated, to enable transmission and reception via the communication link 626. Received program code may be executed by processor 604 as received and/or stored in disk drive component 610 or some other non-volatile storage component for execution.

Figure 7:
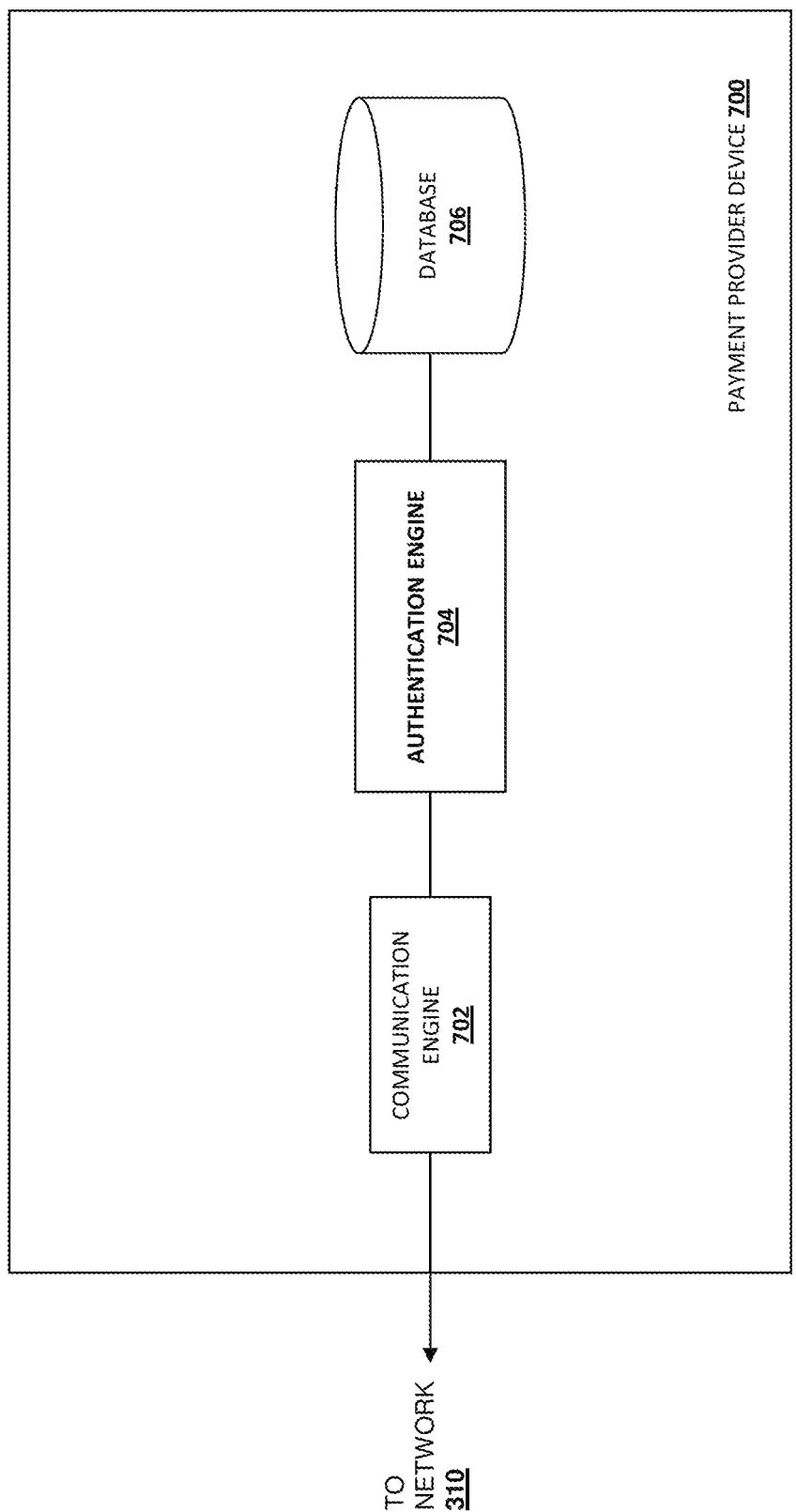
FIG. 7 is a schematic view illustrating an embodiment of a system provider device.

Referring now to FIG. 7, an embodiment of a payment provider device 700 is illustrated. In an embodiment, the device 700 may be the system provider device 308 discussed above. The device 700 includes a communication engine 702 that is coupled to the network 310 and to an authentication engine 704 that is coupled to a database 706. The communication engine 702 may be software or instructions stored on a computer-readable medium that allows the device 700 to send and receive information over the network 310. The authentication engine 704 may be software or instructions stored on a computer-readable medium that is operable to receive authentication information for a user account, receive a request to enable access to a subset of data, receive a biometric authentication signature and password for the subset of data, generate a cryptographic encryption key, encrypt the subset of data, store the encrypted subset of data, receive a request to view the subset of data, receive a biometric authentication signature and password for the subset of data, generate a cryptographic decryption key, decrypt the encrypted subset of data, and display the subset of data. While the database 706 has been illustrated as located in the payment provider device 700, one of skill in the art will recognize that it may be connected to the authentication engine 704 through the network 310 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
receiving, from a computing device, a request for a payment token to enable offline payment capabilities for an account associated with a payment services provider via an application on the computing device, wherein the application is associated with the payment services provider for processing of a payment for a purchase;
receiving a biometric authentication signature corresponding to the account;
determining data corresponding to the account for the payment token to be encrypted based on the biometric authentication signature;
generating the payment token based on the data, wherein the payment token enables the data to be communicated to another device to authorize the payment for the purchase;
determining a hash of the biometric authentication signature converted from details of the biometric authentication signature using a hashing operation shared by the computing device and the system;
determining a key generation algorithm for the application on the computing device, wherein the key generation algorithm enables the application to derive a cryptographic decryption key corresponding to the cryptographic authentication key from the password and the biometric authentication signature, and wherein the key generation algorithm is periodically modified;
generating a cryptographic authentication key based on the hash using the key generation algorithm;
encrypting the payment token using the cryptographic authentication key to create an encrypted payment token;
sending the encrypted payment token to the computing device, wherein the encrypted payment token is decryptable, while the computing device is offline, using the biometric authentication signature and the key generation algorithm, and wherein upon being decrypted into the payment token, the payment token is usable to authorize the payment for the purchase;
receiving the payment token from the other device for the payment for the purchase, wherein the payment token is received based on a decryption of the encrypted payment token by the computing device while offline using the cryptographic decryption key generated from the key generation algorithm; and modifying the key generation algorithm at an expiration date of the encrypted payment token.

2. The system of claim 1, wherein the account is authorized on the computing device prior to the request being received.

3. The system of claim 1, wherein the biometric authentication signature is one or more of a fingerprint, an audible passphrase, or a face scan.

4. The system of claim 1, wherein the operations further comprise:
receiving, from the computing device, an activation of a set of options corresponding to the payment token, wherein the set of options include at least one of an amount limit of the payment token, a specified merchant at which the payment token is usable, or the expiration date for the payment token.

5. The system of claim 4, wherein the amount limit of the payment token is deducted from an account balance of the account associated with the payment services provider at the time the payment token request is received.

6. The system of claim 4, wherein an amount paid using the payment token decrypted using the cryptographic decryption key is deducted from an account balance of the account associated with the payment services provider at a time the payment token is used.

7. The system of claim 1, wherein the encrypted payment token is stored on the computing device, and wherein the encrypted payment token is decryptable by the computing device using the biometric authentication signature.

8. The system of claim 1, wherein the payment token is usable to authorize the payment for the purchase by the computing device displaying a barcode or a quick response (QR) code for scanning.

9. The system of claim 1, wherein the payment token decrypted using the cryptographic decryption key is usable to authorize the payment for the purchase by the computing device causing the computing device to transmit the payment token using a wireless method of transmission.

10. The system of claim 9, wherein the wireless method of transmission includes one of near-field communication or Bluetooth®.

11. A non-transitory machine-readable medium having stored thereon machine-readable instructions executable to cause a computing device to perform operations comprising:
receiving, on the computing device, a user request to authorize payment for a purchase using an account associated with a payment services provider via an application on the computing device, wherein the application is associated with the payment services provider for processing of a payment;
receiving, using one or more input devices on the computing device, a biometric authentication signature;
determining a hash of the biometric authentication signature converted from details of the biometric authentication signature using a hashing operation shared by the computing device and the payment services provider;
determining a key generation algorithm for the application on the computing device, wherein the key generation algorithm enables the application to derive a cryptographic decryption key corresponding to the cryptographic authentication key from the password and the biometric authentication signature, and wherein the key generation algorithm is modifiable;
generating a cryptographic authentication key based on the hash using the key generation algorithm;
decrypting an encrypted payment token stored on the computing device using the cryptographic decryption key;
using the decrypted payment token to authorize the payment using the account associated with the payment services provider; and
modifying the key generation algorithm at an expiration of the encrypted payment token.

12. The non-transitory machine-readable medium of claim 11, wherein the encrypted payment token is generated using the cryptographic authentication key based on a previously provided biometric authentication signature received from a user of the computing device.

13. The non-transitory machine-readable medium of claim 11, wherein the one or more input devices include biometric sensors and a keypad, and wherein the keypad is a touch-sensitive keypad displayed on a screen on the computing device or an external keyboard.

14. The non-transitory machine-readable medium of claim 11, wherein using the decrypted payment token to authorize the payment for the purchase comprises displaying a barcode or a quick response (QR) code on the computing device for scanning.

15. The non-transitory machine-readable medium of claim 11, wherein using the decrypted payment token to authorize the payment for the purchase comprises transmitting the payment token decrypted using the cryptographic decryption key using a wireless method of transmission, and wherein the wireless method of transmission includes one of near-field communication or Bluetooth®.

16. A computer-implemented method for enabling offline payments, comprising:
receiving, from a computing device, a request for a payment token to enable offline payment capabilities for an account associated with a payment services provider via an application on the computing device, wherein the application is associated with the payment services provider for processing of a payment for a purchase;
receiving a biometric authentication signature corresponding to the account;
determining data corresponding to the account for the payment token to be encrypted based on the biometric authentication signature;
generating the payment token based on the data, wherein the payment token enables the data to be communicated to another device to authorize the payment for the purchase;
determining a representation of the biometric authentication signature converted from details of the biometric authentication signature using a mathematical operation shared by the computing device and the system;
determining a key generation algorithm for the application on the computing device, wherein the key generation algorithm enables the application to derive a cryptographic decryption key corresponding to the cryptographic authentication key from the password and the biometric authentication signature, and wherein the key generation algorithm is modifiable;
generating a cryptographic authentication key based on the representation using the key generation algorithm;
encrypting the payment token using the cryptographic authentication key to create an encrypted payment token;

sending the encrypted payment token to the computing device, wherein the encrypted payment token is decryptable, while the computing device is offline, using the biometric authentication signature, and wherein upon being decrypted into the payment token, the payment token is usable to authorize the payment for the purchase;

receiving the payment token from the other device for the payment for the purchase, wherein the payment token is received based on a decryption of the encrypted payment token by the computing device while offline; and modifying the key generation algorithm at an expiration of the encrypted payment token.

17. The computer-implemented method of claim 16, wherein the biometric authentication signature is one or more of a fingerprint, an audible passphrase, or a face scan.

18. The computer-implemented method of claim 16, further comprising:

receiving, from the computing device, an activation of a set of options corresponding to the payment token, wherein the set of options include at least one of an amount limit of the payment token, a specified merchant at which the payment token is usable, or an expiration date for the payment token.

19. The computer-implemented method of claim 18, wherein the amount limit of the payment token is deducted from an account balance of the account associated with the payment services provider at the time the payment token request is received.

20. The computer-implemented method of claim 18, wherein an amount paid using the payment token decrypted using the cryptographic decryption key is deducted from an account balance of the account associated with the payment services provider at a time the payment token is used.

\* \* \* \* \*